United States Patent
Fujiwara et al.

(10) Patent No.: US 11,358,488 B2
(45) Date of Patent: Jun. 14, 2022

(54) INFORMATION PROCESSING SYSTEM

(71) Applicant: IHI Corporation, Tokyo (JP)

(72) Inventors: Eiichiro Fujiwara, Tokyo (JP); Kenichi Takahashi, Tokyo (JP); Shinya Kono, Tokyo (JP); Jun Araki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 90 days.

(21) Appl. No.: 16/964,769

(22) PCT Filed: Feb. 14, 2019

(86) PCT No.: PCT/JP2019/005358
§ 371 (c)(1),
(2) Date: Jul. 24, 2020

(87) PCT Pub. No.: WO2019/163639
PCT Pub. Date: Aug. 29, 2019

(65) Prior Publication Data
US 2021/0053458 A1   Feb. 25, 2021

(30) Foreign Application Priority Data
Feb. 23, 2018 (JP) .............................. JP2018-030492

(51) Int. Cl.
*H02J 7/00* (2006.01)
*B60L 53/65* (2019.01)
(Continued)

(52) U.S. Cl.
CPC ............... *B60L 53/65* (2019.02); *B60L 50/40* (2019.02); *B60L 50/50* (2019.02)

(58) Field of Classification Search
None
See application file for complete search history.

(56) References Cited

U.S. PATENT DOCUMENTS

| | | | |
|---|---|---|---|
| 2008/0039979 A1* | 2/2008 | Bridges | ............ B60L 53/65 700/292 |
| 2008/0221746 A1* | 9/2008 | Plishner | ............ G07F 15/008 701/22 |

(Continued)

FOREIGN PATENT DOCUMENTS

| DE | 102016212026 A1 | 1/2018 |
|---|---|---|
| JP | 2006-331405 A | 12/2006 |

(Continued)

OTHER PUBLICATIONS

ENERES Co., Ltd , "Chosen for 'Construction and Verification Project for Virtual Power Plant/Aggregator Project'," http://www.eneres.co.jp/pr/20160729.html, Jul. 29, 2016, 8 pgs.

(Continued)

*Primary Examiner* — Arun C Williams
(74) *Attorney, Agent, or Firm* — Volpe Koenig

(57) ABSTRACT

An information processing system includes: a first acquisition unit that acquires battery information on a battery of each of one or more vehicles; a second acquisition unit that acquires supply source information on a state of a power supply source; a selection unit that selects a vehicle for providing electric power for the power supply source as a power source out of the one or more vehicles, based on the supply source information and the battery information; and a request unit that requests the vehicle selected as the power source to provide the electric power.

6 Claims, 4 Drawing Sheets

(51) Int. Cl.
*B60L 50/50* (2019.01)
*B60L 50/40* (2019.01)

(56) References Cited

U.S. PATENT DOCUMENTS

| | | | |
|---|---|---|---|
| 2012/0249068 A1 | 10/2012 | Ishida | |
| 2014/0117933 A1 | 5/2014 | Nyu | |
| 2015/0294329 A1* | 10/2015 | Saito | ............... G06Q 50/06 |
| | | | 705/7.31 |
| 2016/0075247 A1 | 3/2016 | Uyeki | |
| 2019/0138006 A1 | 5/2019 | Simon | |
| 2020/0410579 A1* | 12/2020 | Takada | ............... G06Q 30/0645 |

FOREIGN PATENT DOCUMENTS

| | | |
|---|---|---|
| JP | 2012-196122 A | 10/2012 |
| JP | 2013-188103 A | 9/2013 |
| JP | 2014-023377 A | 2/2014 |
| JP | 2014-068414 A | 4/2014 |
| JP | 2017-195722 A | 10/2017 |
| WO | 2011/077780 A1 | 6/2011 |
| WO | 2012/173194 A1 | 12/2012 |

OTHER PUBLICATIONS

Takeuchi, Junko, et al., "Game Change to Utility 3.0 in 2050 of Energy Industry," Nikkei Publishing Inc., Sep. 2017, 4 pgs.

\* cited by examiner

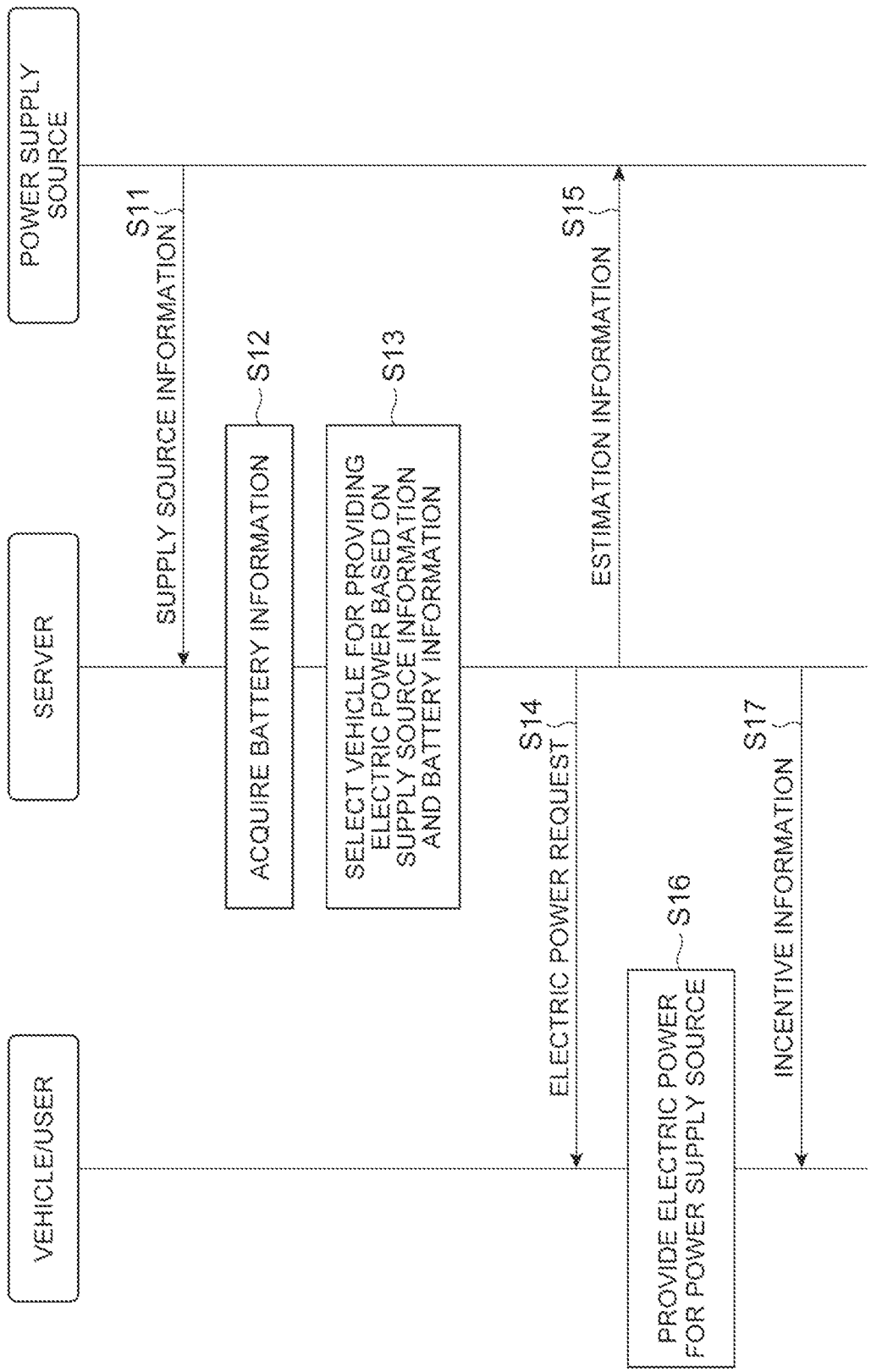

INFORMATION PROCESSING SYSTEM

TECHNICAL FIELD

An aspect of the present disclosure relates to an information processing system that supports supply of electric power.

BACKGROUND ART

A mechanism is known that uses a battery of a vehicle for supply of electric power to another facility. For example, Non Patent Literatures 1 and 2 describe examples of such mechanisms.

Citation List

Non Patent Literature

Non Patent Literature 1: "Chosen for 'Construction and Verification Project for Virtual Power Plant/Aggregator Project,'" [online], Jul. 29, 2016, ENERES Co., Ltd., [accessed Jan. 15, 2018], Internet <http://www.eneres.co.jp/pr/20160729.html>

Non Patent Literature 2: Junko Takeuchi et al., "Game Change to Utility 3.0 in 2050 of Energy Industry," Nikkei Publishing Inc., September, 2017, pp. 137

SUMMARY OF INVENTION

Technical Problem

It is preferable that suitable vehicles be selected when batteries of vehicles are used for electric power supply to another facility.

Solution to Problem

According to an aspect of the present disclosure, there is provided an information processing system including: a first acquisition unit configured to acquire battery information on a battery of each of one or more vehicles; a second acquisition unit configured to acquire supply source information on a state of a power supply source; a selection unit configured to select a vehicle for providing electric power for the power supply source as a power source out of the one or more vehicles, based on the supply source information and the battery information; and a request unit configured to request the vehicle selected as the power source to provide the electric power.

Effects of Invention

According to the aspect of the present disclosure, it is possible to appropriately select a vehicle to be used for electric power supply to another facility.

BRIEF DESCRIPTION OF DRAWINGS

FIG. 4 is a sequence diagram illustrating an example of a process flow performed by the information processing system according to the embodiment.

DESCRIPTION OF EMBODIMENTS

Figure 1:
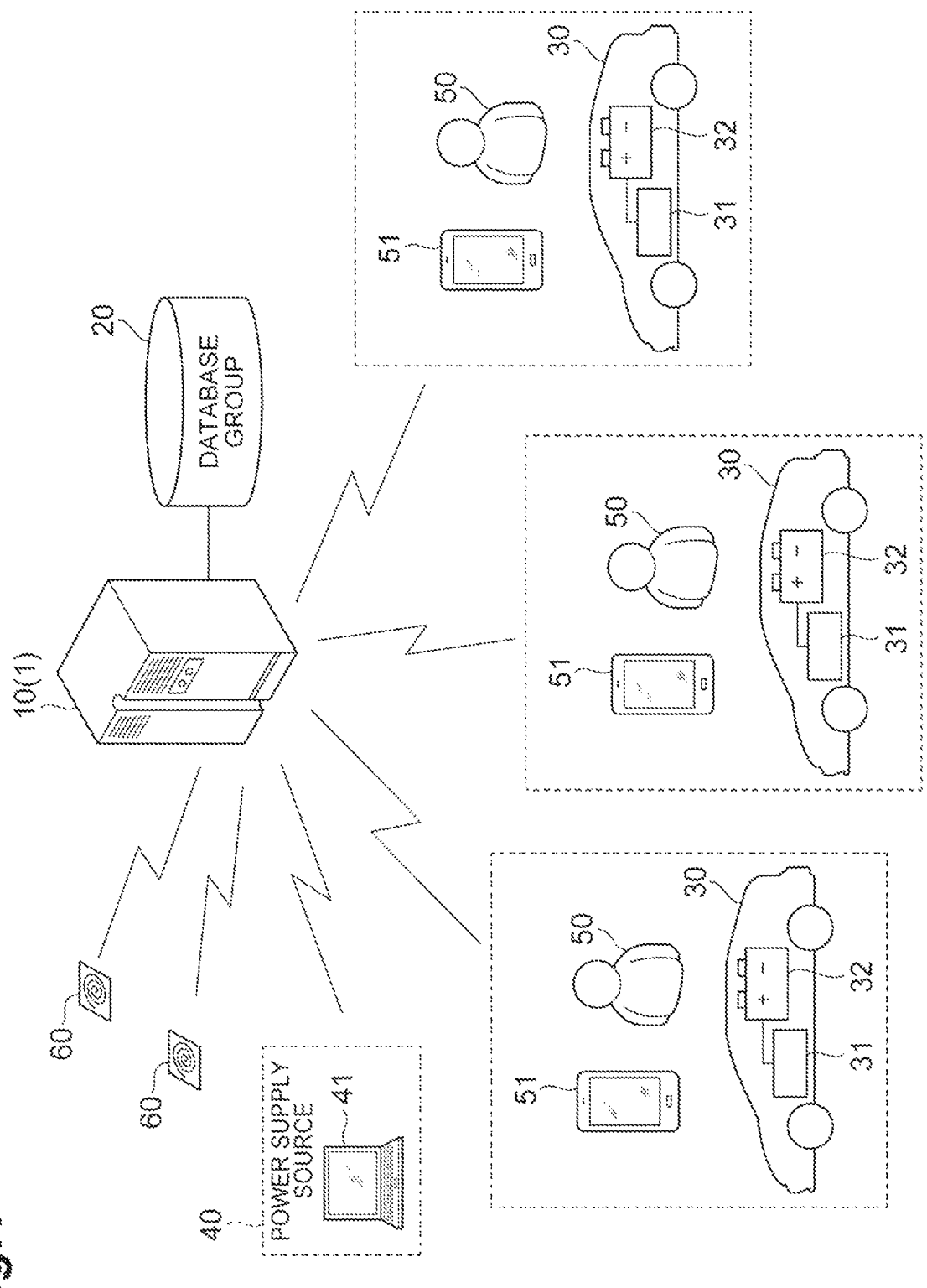
FIG. 1 is a diagram illustrating an application example of an information processing system according to an embodiment.

An information processing system according to an aspect of the present disclosure includes a first acquisition unit configured to acquire battery information on a battery of each of one or more vehicles, a second acquisition unit configured to acquire supply source information on a state of a power supply source, a selection unit configured to select a vehicle for providing electric power for the power supply source as a power source out of the one or more vehicles, based on the supply source information and the battery information, and a request unit configured to request the vehicle selected as the power source to provide electric power.

In this aspect, a vehicle that is to provide electric power for the power supply source is selected based on both a battery of each vehicle and a state of the power supply source. Accordingly, it is possible to appropriately select vehicles to be used for electric power supply to another facility.

In the information processing system according to another aspect, the selection unit may select the vehicle which is to serve as the power source, based on a geometrical positional relationship between the power supply source and the one or more vehicles. It is possible to select a vehicle which is suitable for an electric power pool as a power source in consideration of the geometrical positional relationship.

In the information processing system according to another aspect, the selection unit may select the vehicle located in a power transmission area of the power supply source as the power source. By selecting a vehicle in this way, it is possible to save a power transmission system and to decrease a transmission loss in distribution of electric power from the vehicle.

In the information processing system according to another aspect, the selection unit may select the vehicle moving to a power transmission area of the power supply source as the power source. By selecting a vehicle with a likelihood of presence in a power transmission area of the power supply source, it is possible to save a power transmission system and to decrease a transmission loss in distribution of electric power from the vehicle.

In the information processing system according to another aspect, the selection unit may select the vehicle in which an SOC of the battery is equal to or greater than a threshold as the power source. By selecting a vehicle in this way, it is possible to expect provision of a sufficient amount of electric power from the vehicle.

In the information processing system according to another aspect, the selection unit may determine at least one of an amount of electric power to be provided, a provision destination, and a provision date and time, and the request unit may transmit an electric power request including at least one of the amount of electric power to be provided, the provision destination, and the provision date and time to the vehicle selected as the power source. A user corresponding to the vehicle can understand a schedule of distribution of electric power based on the electric power request.

In the information processing system according to another aspect, the selection unit may determine a movement destination of the vehicle selected as the power source, and the request unit may transmit an electric power request including the movement destination to the vehicle selected as the power source. By notifying of the movement destination, it is possible to guide the vehicle to a place which is suitable for electric power supply.

The information processing system according to another aspect may further include an incentive managing unit configured to provide an incentive to a user corresponding to the vehicle selected as the power source. By providing an incentive, it is possible to cause a user to provide electric power from the corresponding vehicle.

Hereinafter, an embodiment of the present disclosure will be described in detail with reference to the accompanying drawings. In description of the drawings, the same or corresponding elements will be referred to by the same reference signs and description thereof will not be repeated.

Outline of System

An information processing system 1 according to an embodiment is a computer system that supports electric power supply to another facility using a battery (a chargeable battery) of a vehicle. "Electric power supply to another facility using a battery of a vehicle" means that electric power (electricity) stored in the battery of the vehicle is provided to another facility. The other facility is not particularly limited and may be, for example, a load that consumes electric power or may be another battery. A location of the other facility is not limited and it may be located, for example, in a place relatively close to the vehicle or may be located in a place relatively distant from the vehicle.

The information processing system 1 selects a vehicle that provides electric power for a power supply source out of one or more vehicles as a power source, based on battery information on batteries of the one or more vehicles and supply source information on a state of the power supply source. Then, the information processing system 1 requests the selected vehicle to provide electric power. Thereafter, the vehicle having received the request supplies electric power in the battery thereof to another facility for the power supply source. That is, the vehicle serves as a power source. The information processing system 1 provides an incentive to a user corresponding to the vehicle having provided electric power.

A "vehicle" is an instrument that transports a person or an object from a certain place to another place. The vehicle includes a battery as at least a part of a power source. In this embodiment, an electric vehicle is exemplified as the vehicle, but the type of the vehicle is not particularly limited. For example, the vehicle may be another type of automobile or may be a motorbike, a bicycle, a train, an overwater vehicle, an underwater vehicle, or an airplane. Accordingly, a route on which the vehicle travels may be an overland route, a waterway, or an aerial route. The vehicle additionally includes a power receiving device that receives electric power to be stored in its battery.

A "power supply source" is a facility that includes a power generator. The type, scale, and owner of the power supply source are not particularly limited. For example, the power supply source may be an arbitrary type of power plant. For example, the power supply source may be a power plant using renewable energy such as solar power, wind power, water power, or geothermal power (including binary power) or may be a thermoelectric power plant or a nuclear power plant.

A "user corresponding to a vehicle" is a person who is directly or indirectly associated with the vehicle. A relationship between the vehicle and the user is not limited. For example, the user may be a driver or an operator of the vehicle, may be an occupant of the vehicle, or may be a person who is not in the vehicle. Alternatively, the user may be an owner a borrower of the vehicle or may be a person interested in (for example, a family member, a friend, or an acquaintance of) the owner or the vehicle owner.

An "incentive" is a special service which is provided to a user. The type and details of the incentive are not particularly limited. For example, the incentive may be provision of a tangible thing or an intangible thing to a user. Specifically, the incentive may be provision of a souvenir (a novelty item), a commodity, or a service. Alternatively, the incentive may be discount in purchasing products. Alternatively, the incentive may be provision of a free ticket or provision of points having a monetary value. The incentive is not limited to such examples. A provider of the incentive and a provider of a principal fund of the incentive are not particularly limited. The incentive can motivate a user to provide a vehicle as a power source and thus serve as an incentive for a user.

Since a vehicle can supply electric power regardless of seasons, weather, and time periods, the vehicle can be considered as a base load power source. Alternatively, since a vehicle can supply electric power when electric power of a power supply source becomes insufficient, the vehicle can also be considered as a middle power source. High costs are required for construction of a power supply source (a power generation facility), and maintenance costs are required after operation thereof. When electric power supply depends on only electric power from a power supply source, the power supply source needs to be constructed based on the assumption of an electric power peak and thus capital investment and maintenance costs thereof further increase. Particularly, when a power supply source is a power plant (for example, a power plant using renewable energy) of which electric power to be supplied (an amount of electric power to be output) is not stable, a battery (a stationary battery) is assembled into a power plant in a stationary manner in order to achieve stabilization of electric power to be supplied. In this case, the stationary battery needs to be constructed to cope with an electric power peak and thus capital investment and maintenance costs thereof increase with an increase in capacity of the stationary battery.

Accordingly, a vehicle is used according to necessity to complement supply of electric power from a power supply source. Specifically, when a vehicle moves to a facility or an area (for example, a power transmission area which will be described later) into which a system that can receive electric power from a power supply source is introduced, the necessity for setting a function of the power supply source (particularly, the capacity of the stationary battery of the power supply source) depending on an electric power peak decreases. When many vehicles are collected, batteries corresponding to the number of vehicles can be collected to construct a large-sized battery and thus it is not necessary to increase the capacity of the battery mounted in each vehicle. Accordingly, it is possible to curb costs of the power supply source and to expect supply of electric power at low costs. When the power supply source is a power generation facility using renewable energy, a vehicle serving as a power source can complement the power supply source to lead to spread of the renewable energy. On the other hand, a user of a vehicle can effectively utilize the vehicle (improve an operation rate of the vehicle). For example, an owner of a commercial vehicle can use the commercial vehicle for both the owner's business and provision of electric power. In order to realize a flexible electric power pool having these advantages, the information processing system 1 serves as a mediator to perform matching between the power supply source and the vehicles.

FIG. 1 is a diagram schematically illustrating an application example of the information processing system 1. The information processing system 1 mediates between one or more vehicles 30 that can support electric power supply and a power supply source 40 that receives the support. FIG. 1 illustrates a plurality of vehicles 30 and a single power supply source 40, but the number of vehicles 30 and the number of power supply sources 40 using the information processing system 1 are not particularly limited. The information processing system 1 includes a server 10 that performs a main function for mediation. The server 10 refers to a database group 20 that stores data required for performing the function according to necessity. The server 10 can perform data communication with the vehicles 30, user terminals 51 of users 50 corresponding to the vehicles 30, a supply source terminal 41 which is a terminal of the power supply source 40, and a power transmitting device 60. The server 10 is connected to the database group 20, the vehicles 30, the supply source terminal 41, the user terminals 51, and the power transmitting device 60 via a communication network. The configuration of the communication network is not particularly limited and the communication network may be constructed, for example, using arbitrary communication networks such as the Internet and an intranet.

The supply source terminal 41 is a computer that is managed by the power supply source 40. The type of the computer used as the supply source terminal 41 is not particularly limited. For example, the supply source terminal 41 may be a personal computer or a server. Alternatively, the supply source terminal 41 may be a mobile terminal such as a high-functional mobile phone (a smartphone), a mobile phone, a personal digital assistant (PDA), a tablet, or a laptop PC. Alternatively, at least a part of a computer system including one or more computers may serve as the supply source terminal 41.

A user terminal 51 is a computer operated by a user 50. The type of the computer used as the user terminal 51 is not particularly limited and the user terminal 51 may or may not be mounted in a vehicle 30. For example, the user terminal 51 may be a car navigation system or a mobile terminal such as a high-functional mobile phone (a smartphone), a mobile phone, a personal digital assistant (PDA), a tablet, or a laptop PC. When the user terminal 51 is not mounted in a vehicle 30, the user terminal 51 may be connected to a system in the vehicle 30 or may not be connected to the system.

The power transmitting device 60 is a device that can charge a battery 32 of a vehicle 30. Electricity provided from the power transmitting device 60 is received by a power receiving device 31 of the vehicle 30 and stored in the battery 32 as energy, whereby the battery 32 is charged. The type of the power transmitting device 60 is not particularly limited and may be, for example, a wireless power transmitting device or a wired (also referred to as a cable type or a receptacle type) power transmitting device. The power transmitting device 60 is provided in an arbitrary facility. The type, scale, and owner of the facility are not particularly limited. For example, the facility may be an arbitrary commercial facility, an arbitrary public facility, or an arbitrary private facility. More specific examples of the facility include a charging station, a shopping mall, a restaurant, a cafeteria, a parking lot, a stadium, a hospital, a city hall, a park, an apartment, a solitary house, a harbor, and an airport. However, the facility is not limited such examples.

[Configuration of System]

Figure 2:
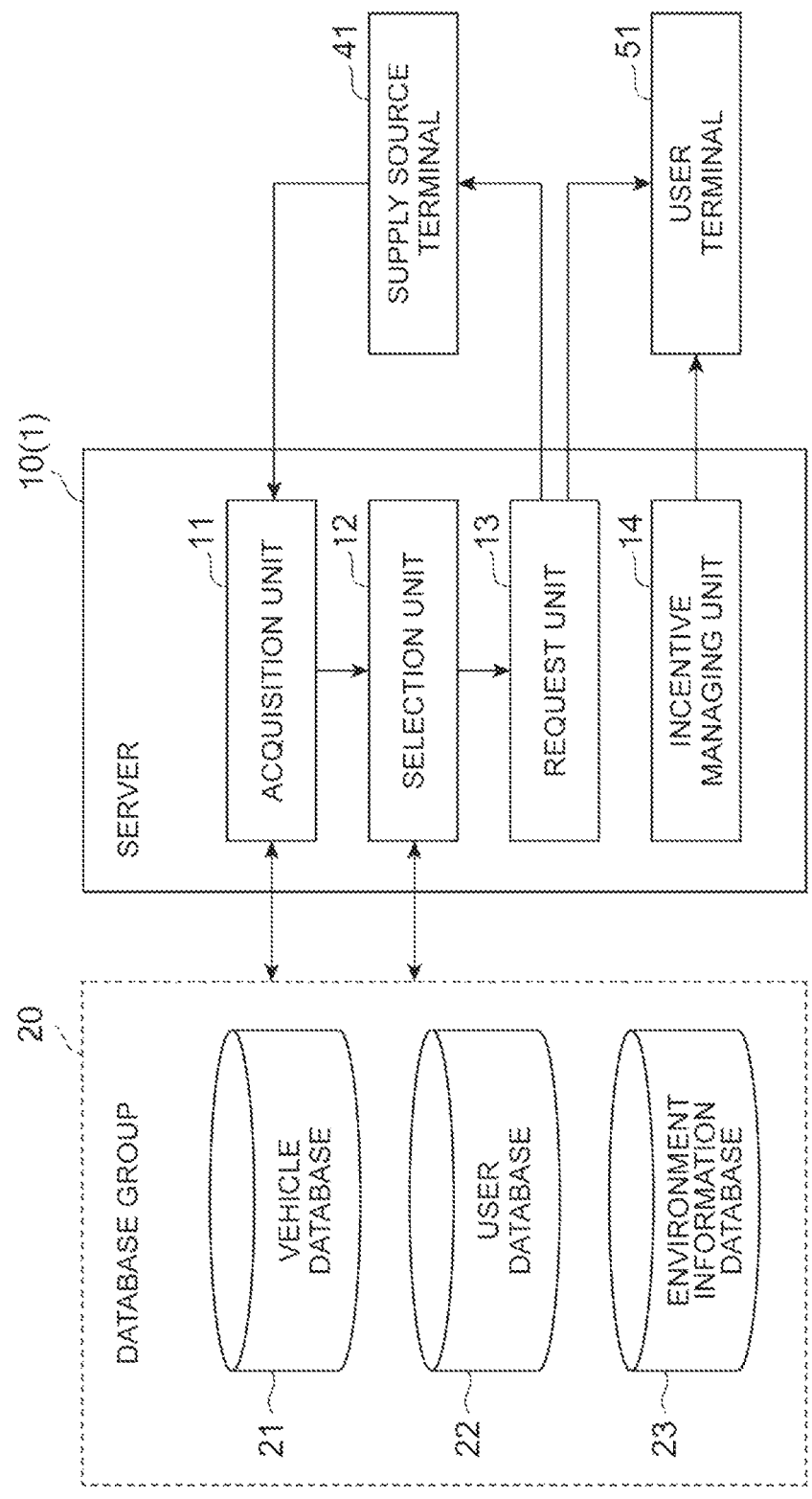
FIG. 2 is a diagram illustrating an example of a configuration of the information processing system according to the embodiment.

FIG. 2 is a diagram illustrating an example of a configuration of the information processing system 1. The information processing system 1 (the server 10) includes an acquisition unit 11, a selection unit 12, a request unit 13, and an incentive managing unit 14 as functional elements. The acquisition unit 11 is a functional element that acquires battery information and supply source information and thus serves as a first acquisition unit and a second acquisition unit. The selection unit 12 is a functional element that selects a vehicle 30 for providing electric power for the power supply source 40 as a power source, based on the supply source information and the battery information. The request unit 13 is a functional element that requests the selected vehicle 30 to provide electric power. The incentive managing unit 14 is a functional element that provides an incentive to a user 50 corresponding to a vehicle 30 having provided electric power. These functional elements access the database group 20 and read or write data according to necessity.

Figure 3:
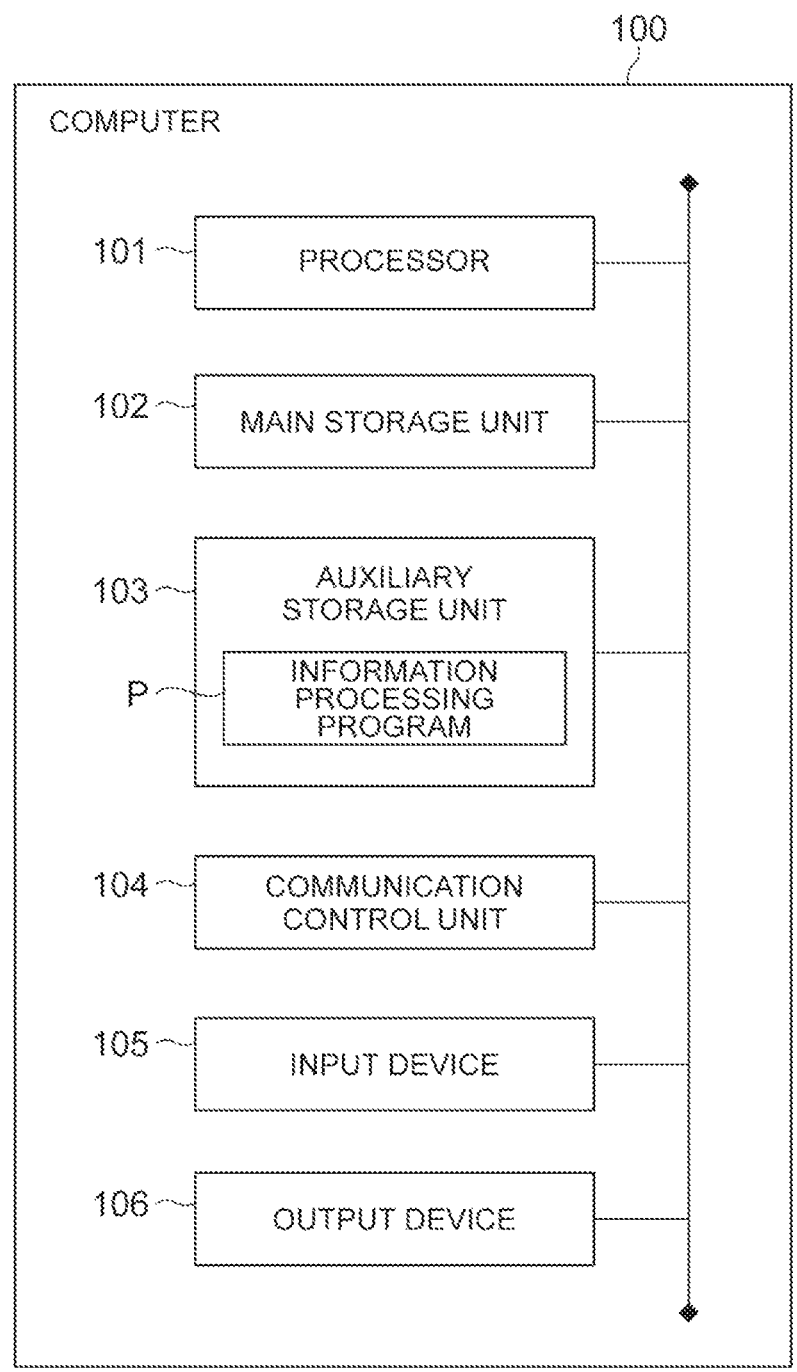
FIG. 3 is a diagram illustrating a general hardware configuration of a computer used for the information processing system according to the embodiment.

FIG. 3 is a diagram illustrating a general hardware configuration of a computer 100 which constitutes the information processing system 1 (the server 10). For example, the computer 100 includes a processor 101, a main storage unit 102, an auxiliary storage unit 103, a communication control unit 104, an input device 105, and an output device 106. The processor 101 executes an operating system and an application program. The main storage unit 102 includes, for example, a ROM and a RAM. The auxiliary storage unit 103 includes, for example, a hard disk or a flash memory and generally stores a larger amount of data than the main storage unit 102 does. The auxiliary storage unit 103 stores an information processing program P for causing at least one computer to serve as the information processing system 1 (the server 10). The communication control unit 104 includes, for example, a network card or a radio communication module. The input device 105 includes, for example, a keyboard, a mouse, and a touch panel. The output device 106 includes, for example, a monitor and a speaker.

The functional elements of the information processing system 1 (the server 10) are realized by reading the information processing program P onto the processor 101 or the main storage unit 102 and executing the information processing program P. The information processing program P includes codes for realizing the acquisition unit 11, the selection unit 12, the request unit 13, and the incentive managing unit 14. The processor 101 causes the communication control unit 104, the input device 105, or the output device 106 to operate in accordance with the information processing program P and performs reading and writing of data in the main storage unit 102 or the auxiliary storage unit 103. By this process, the functional elements of the information processing system 1 (the server 10) are realized. Data or a database required for the process may be stored in the main storage unit 102 or the auxiliary storage unit 103.

The information processing program P may be provided in a state in which it is fixedly recorded on a materialized recording medium such as a CD-ROM, a DVD-ROM, or a semiconductor memory. Alternatively, the information processing program P may be provided as a data signal which is superimposed on carrier waves via the communication network. The provided information processing program P is stored in the auxiliary storage unit 103.

The information processing system 1 (the server 10) may be constituted by a single computer or may be constituted by a plurality of computers. When a plurality of computers are used, the computers are connected to each other via a communication network such as the Internet or an intranet, whereby the information processing system 1 (for example, a logically single server 10) is constructed.

The database group 20 is a group of one or more databases that store data required for the process of the information processing system 1. A database is a functional element (a storage unit) that stores a data group to cope with an arbitrary data operation (for example, extraction, addition, deletion, or overwriting) from a processor or an external computer. The method of mounting a database is not limited and the database may be, for example, a relational database. A management entity and an installation place of the database group 20 are not particularly limited. For example, the database group 20 may be managed by a computer system other than the information processing system 1 or may be a part of the information processing system 1. The management entities of the individual databases may be different from each other or may be the same. In this embodiment, the database group 20 includes a vehicle database 21, a user database 22, and an environment information database 23.

The vehicle database 21 is a device that stores vehicle information. The vehicle information is information on each vehicle 30. The configuration of vehicle information is not particularly limited. For example, each record of the vehicle information may include a vehicle ID, a user ID, and vehicle attributes.

A vehicle ID is an identifier for uniquely identifying a vehicle 30. The method of setting a vehicle ID is not particularly limited. For example, a vehicle ID may be unique information such as a vehicle number or may be replaced with an identifier of the power receiving device 31 or the battery 32 mounted in the corresponding vehicle 30.

A user ID is an identifier for uniquely identifying a user 50. A user ID is set, for example, when a user 50 registers himself or herself for providing electric power in the battery 32 of a vehicle 30.

Vehicle attributes are information indicating nature or features of a vehicle 30. Data items constituting vehicle attributes are not particularly limited. For example, vehicle attributes may include at least one of a model number, a travel distance, and a travel history of a vehicle 30. The vehicle attributes may further include battery attributes. The battery attributes are information indicating nature or features of a battery 32. The battery attributes may include at least one of a model number and a state of charge (SOC) of a battery 32. Alternatively, the battery attributes may include a charging history which is past records of charging the battery 32. A charging history may include, for example, an amount of electric power charged, a charging place, and a charging date and time. A charging date and time may be expressed by a time at which a vehicle 30 has entered or exited the power transmitting device 60.

The information processing system 1 (the server 10) may generate records of vehicle information based on data received from the user terminals 51, the power transmitting device 60, or the vehicles 30 (for example, the power receiving devices 31) and store the generated records in the vehicle database 21. Alternatively, a computer system other than the information processing system 1 may generate and store vehicle information.

The user database 22 is a device that stores user information. The user information is information on each user 50. The configuration of user information is not particularly limited. For example, each record of the user information may include a user ID and user attributes. The user attributes are information indicating nature or features of a user 50. Data items constituting the user attributes are not particularly limited. For example, the user attributes may include at least one of a name, a sex, an address, a phone number, a mail address, a hobby, a taste, and an incentive received in the past. The user attributes may include information on a vehicle 30 (for example, a vehicle ID).

The user information is generated, for example, when a user 50 has registered himself or herself to provide electric power in a battery 32 of a vehicle 30, and is stored in the user database 22. Generation and storage of the user information may be performed by the information processing system 1 (the server 10) or may be performed by a computer system other than the information processing system 1.

The environment information database 23 is a device that stores environment information. The environment information is information indicating arbitrary details that may affect supply of electric power. Details of the environment information are not particularly limited. For example, the environment information may include past or present weather information of each region, include forecast of the weather in the future, or include present electricity prices of each region. Generation and storage of environment information may be performed by the information processing system 1 (the server 10) or may be performed by a computer system (for example, a weather system or a system of a power supply source 40) other than the information processing system 1.

The configurations of the databases in the database group 20 and the records thereof are not limited to the above description and arbitrary normalization or redundancy may be performed on the databases.

[Operation of System]

The operation of the information processing system 1 will be described below and an information processing method according to this embodiment will also be described below. FIG. 4 is a sequence diagram illustrating an example of the operation of the information processing system 1. In description with reference to FIG. 4, a process of selecting one or more vehicles 30 for one power supply source 40 will be described for the purpose of concise explanations.

In Step S11, a supply source terminal 41 of a power supply source 40 for which provision of electric power is desired transmits supply source information to the server 10. The supply source information is information on the state of the power supply source 40. The power supply source 40 (for example, the supply source terminal 41) calculates a scheduled supply of electric power and a predicted demand of electric power thereof. A time point at which the supply of electric power and the demand of electric power are predicted is not particularly limited. For example, the power supply source 40 (for example, the supply source terminal 41) may calculate a scheduled supply of electric power and a predicted demand of electric power several hours after or may calculate a scheduled supply of electric power and a predicted demand of electric power several days after. When the scheduled supply of electric power is less than the predicted demand of electric power, the supply source terminal 41 transmits, to the server 10, supply source information including a predicted amount of shortage which is a difference between the scheduled supply of electric power and the predicted demand of electric power and a supply source ID for uniquely identifying the power supply source 40. Alternatively, the scheduled supply of electric power is greater than the predicted demand of electric power and the difference therebetween is less than a threshold, the supply source terminal 41 may transmit supply source information including the difference and the supply source ID to the server 10. The predicted amount of shortage and the difference are an example of information indicating the state of the power supply source 40. In the server 10, the acquisition unit 11 receives the supply source information (a second acquisition step). When the scheduled supply of electric power is equal to or greater than the predicted demand of electric power, the process of Step S11 may not be performed. In this case, the processes of Step S12 and steps subsequent thereto are not performed.

The power supply source 40 may start the process of Step S11 at an arbitrary time. For example, the power supply source 40 may periodically perform the process of Step S11.

In Step S12, the acquisition unit 11 acquires battery information on a battery 32 of each of one or more vehicles 30 from the vehicle database 21 (a first acquisition step). Details of the battery information are not particularly limited. For example, the acquisition unit 11 may acquire at least a part of vehicle information of each vehicle 30 as the battery information of the vehicle 30. For example, the acquisition unit 11 may acquire at least one selected from a travel distance of a vehicle 30, a travel history of the vehicle 30, a model number of a battery 32, an SOC of the battery 32, and a charging history of the battery 32. Accordingly, the acquisition unit 11 may acquire battery attributes as the battery information.

In Step S13, the selection unit 12 selects one or more vehicles 30 for providing electric power as a power source, based on the supply source information and the battery information (a selection step). The method of selecting a vehicle 30 is not particularly limited.

For example, the selection unit 12 may select a vehicle 30 from which provision of electric power is permitted by a user 50 (a first method).

Alternatively, the selection unit 12 may select a vehicle 30 based on a geometrical positional relationship between the power supply source 40 and each of the vehicles 30 (a second method). A "geometrical positional relationship" can be said as a positional relationship based on a physical distance. The selection method based on the geometrical positional relationship is not particularly limited. For example, the selection unit 12 may select a vehicle 30 located in a power transmission area of the power supply source 40. A "power transmission area" refers to an area in which electricity from the power supply source 40 is used. Alternatively, the selection unit 12 may select a vehicle 30 moving to the power transmission area. Alternatively, the selection unit 12 may select a vehicle 30 located in a predetermined specific place (for example, a contracted parking lot). The "specific place" may be located inside the power transmission area of the power supply source 40 or may be located outside the power transmission area. Alternatively, the selection unit 12 may select both a vehicle 30 located in the power transmission area and a vehicle 30 moving to the power transmission area.

Alternatively, the selection unit 12 may select a vehicle 30 in which the SOC of the battery 32 is equal to or greater than a predetermined threshold Ta (a third method). The selection unit 12 may use the SOC indicated by the battery information without any change or may estimate the SOC from the charging history indicated by the battery information.

Alternatively, the selection unit 12 may select a vehicle 30 in combination of two or more methods arbitrarily selected from the first to third methods. For example, the selection unit 12 may select a vehicle 30 located in or is moving to the power transmission area and in which the SOC is equal to or greater than the threshold Ta. Alternatively, the selection unit 12 may select a vehicle 30 for which permission from a user 50 has been acquired and which satisfies other conditions (at least one condition selected in the second and third methods).

Alternatively, the selection unit 12 may select a vehicle 30 additionally based on environment information (for example, the weather or electricity prices) in the environment information database 23 in addition to the supply source information and the battery information (a fourth method). For example, the selection unit 12 adjusts the predicted amount of shortage by multiplying the predicted amount of shortage indicated by the supply source information by a coefficient Ca determined based on the weather. Then, the selection unit 12 selects a vehicle 30 using one or more method arbitrarily selected from the first to third methods, based on the adjusted predicted amount of shortage and the battery information.

The selection unit 12 may select a vehicle 30 using a method other than the first to fourth methods. For example, the selection unit 12 may select all vehicles 30 managed by the information processing system 1 or may randomly select at least one vehicle 30.

The selection unit 12 may determine at least one of an amount of electric power to be provided, a provision destination, and a provision date and time for each of the selected one or more vehicles 30. An amount of electric power to be provided is an amount of electric power to be provided from a vehicle 30. A provision destination is information indicating what consumes electric power provided from a vehicle 30 and may be expressed, for example, by a facility or a place. A provision date and time is a date and time at which a vehicle 30 provides electric power. The selection unit 12 may determine an amount of electric power to be provided, a provision destination, and a provision date and time using an arbitrary method, based on the supply source information and the battery information. For example, the selection unit 12 may determine an amount of electric power to be provided by each vehicle 30 such that the amount of electric power to be provided increases as the SOC increases.

The selection unit 12 may determine a movement destination (a designated place) for electric power supply for each of the selected one or more vehicles 30. This process is performed to move the vehicle 30 to a place which is suitable for electric power supply in consideration of various matters (for example, efficiency or constraints) for electric power supply. The method of determining a movement destination (a designated place) is not particularly limited. For example, the selection unit 12 may determine an arbitrary position in the power transmission area of the power supply source 40 as a movement destination (a designated place).

In Step S14, the request unit 13 transmits an electric power request to the vehicles 30 selected as a power source (a request step). An electric power request is a data signal for requesting a vehicle 30 to provide electric power. "To transmit an electric power request to a vehicle" means that an electric power request is transmitted such that the vehicle 30 can provide electric power. So long as this process can be realized, the request unit 13 may transmit an electric power request to a user terminal 51 corresponding to the vehicle 30 or may transmit the electric power request to a computer other than the user terminal 51. The electric power request may include at least one of amount of electric power to be provided, the provision destination, and the provision date and time which have been determined. Alternatively, the electric power request may include a movement instruction indicating a movement destination of the corresponding vehicle 30, that is, a designated place.

Here, it should be noted that the electric power request does not have to force the vehicle 30 to provide electric power. For example, a vehicle 30 (a user 50) having received an electric power request has a choice for determining whether to actually supply electric power. In this case, when the vehicle 30 (the user 50) having received an electric power request permits supply of electric power, the user terminal 51 corresponding to the vehicle 30 transmits a permission signal to the server 10. The server 10 can estimate actual supply of electric power from one or more vehicles 30 by collecting one or more of the permission signals.

The electric power request may include guidance for an incentive (incentive guidance information) to be provided to a user 50 with provision of electric power. In this case, the user 50 having received the electric power request can understand details of the incentive in advance and determine whether to permit electric power supply based on the incentive guidance information.

In Step S15, the request unit 13 transmits estimation information to the power supply source 40. The estimation information is information indicating to what extent provision of electric power is scheduled for the power supply source 40. The method of expressing estimation information is not particularly limited. For example, estimation information may represent estimation of total electric power to be provided from one or more vehicles 30 or may represent electric power to be provided from each selected vehicle 30. Alternatively, estimation information may represent a value predicted based on the permission signals (for example, total electric power, or electric power to be provided from each vehicle 30 in response to the electric power request).

In Step S16, each of the vehicles 30 selected as a power source provides electric power for the power supply source 40. "To provide electric power for a power supply source" means that electric power from a vehicle is provided for a facility (for example, a load or another battery) which generally uses electric power from a power supply source). That is, this facility receives electric power from a vehicle instead of or in addition to electric power from the power supply source. Accordingly, "To provide electric power for a power supply source" means a concept including Vehicle to Grid (V2G) and Vehicle to Home (V2H). Each vehicle 30 provides electric power in response to the electric power request. As described above, it should be noted that some vehicles 30 having received an electric power request may not provide electric power. For example, only a vehicle 30 corresponding to a user 50 who has permitted electric power supply may actually provide electric power. When the electric power request includes a movement instruction, a user 50 moves a vehicle 30 to a place designated by the movement instruction and then the vehicle 30 provides electric power in the designated place.

In Step S17, the incentive managing unit 14 transmits incentive information to a user 50 corresponding to a vehicle 30 having provided electric power. The incentive information is information indicating an incentive to be provided to the user 50. "To transmit incentive information to a user" means that incentive information is transmitted such that the user 50 can enjoy an incentive. So long as this process can be realized, the incentive managing unit 14 may transmit incentive information to the user terminal 51 or may transmit the incentive information to a computer other than the user terminal 51.

For example, the incentive managing unit 14 manages transactions of electric power between the power supply source 40 and individual vehicles 30 using a register which is installed using block chain technology. For example, the incentive managing unit 14 stores into the register at least one of an amount of electric power provided from individual vehicles 30, an amount of electric power supplied from the power supply source 40, and power consumption of the provided or supplied electric power. The incentive managing unit 14 determines an incentive to be provided to the individual users 50 based on the register and transmits incentive information to the users 50 who are receivers of the incentive. The incentive managing unit 14 may store information on incentives provided to the users 50 into the user database 22. This series of processes is an example and the incentive managing unit 14 may transmit incentive information using any other method.

The information processing system 1 (the server 10) may simultaneously perform the series of processes illustrated in FIG. 4 on a plurality of power supply sources 40 or may perform the series of processes on one power supply source 40 a plurality of times.

Advantages

As described above, an information processing system according to an aspect of the present disclosure includes: a first acquisition unit that acquires battery information on a battery of each of one or more vehicles; a second acquisition unit configured to acquire supply source information on a state of a power supply source; a selection unit configured to select a vehicle for providing electric power for the power supply source as a power source out of the one or more vehicles, based on the supply source information and the battery information; and a request unit configured to request the vehicle selected as the power source to provide electric power.

An information processing method according to an aspect of the present disclosure is an information processing method performed by an information processing system including at least one processor, and the information processing method includes: a first acquisition step of acquiring battery information on a battery of each of one or more vehicles; a second acquisition step of acquiring supply source information on a state of a power supply source; a selection step of selecting a vehicle for providing electric power for the power supply source as a power source out of the one or more vehicles, based on the supply source information and the battery information; and a request step of requesting the vehicle selected as the power source to provide the electric power.

An information processing program according to an aspect of the present disclosure causes a computer system to perform: a first acquisition step of acquiring battery information on a battery of each of one or more vehicles; a second acquisition step of acquiring supply source information on a state of a power supply source; a selection step of selecting a vehicle for providing electric power for the power supply source as a power source out of the one or more vehicles, based on the supply source information and the battery information; and a request step of requesting the vehicle selected as the power source to provide the electric power.

A computer-readable recording medium according to an aspect of the present disclosure stores an information processing program causing a computer system to perform: a first acquisition step of acquiring battery information on a battery of each of one or more vehicles; a second acquisition step of acquiring supply source information on a state of a power supply source; a selection step of selecting a vehicle for providing electric power for the power supply source as a power source out of the one or more vehicles, based on the supply source information and the battery information; and a request step of requesting the vehicle selected as the power source to provide the electric power.

In this aspect, a vehicle that is to provide electric power for the power supply source is selected based on both a battery of each vehicle and a state of the power supply source. Accordingly, it is possible to appropriately select vehicles to be used for electric power supply to another facility. Since the information processing system serves as a mediator to perform matching between the power supply source and the vehicle, a manager of the power supply source does not have to independently find a user of a vehicle, and vice versa. Accordingly, it is possible to reduce an amount of data communication between the power supply source (for example, a supply source terminal) and a user terminal.

In the information processing system according to another aspect, the selection unit may select the vehicle which is to serve as the power source, based on a geometrical positional relationship between the power supply source and the one or more vehicles. It is possible to select a vehicle which is suitable for an electric power pool as a power source in consideration of the geometrical positional relationship.

In the information processing system according to another aspect, the selection unit may select the vehicle located in a power transmission area of the power supply source as the power source. By selecting a vehicle in this way, it is possible to save a power transmission system and to decrease a transmission loss in distribution of electric power from the vehicle.

In the information processing system according to another aspect, the selection unit may select the vehicle moving to a power transmission area of the power supply source as the power source. By selecting a vehicle with a likelihood of presence in a power transmission area of the power supply source, it is possible to save a power transmission system and to decrease a transmission loss in distribution of electric power from the vehicle.

In the information processing system according to another aspect, the selection unit may select the vehicle in which an SOC of the battery is equal to or greater than a threshold as the power source. By selecting a vehicle in this way, it is possible to expect provision of a sufficient amount of electric power from the vehicle.

In the information processing system according to another aspect, the selection unit may determine at least one of an amount of electric power to be provided, a provision destination, and a provision date and time for the vehicle selected as the power source, and the request unit may transmit an electric power request including at least one of the amount of electric power to be provided, the provision destination, and the provision date and time to the vehicle selected as the power source. A user corresponding to the vehicle can understand a schedule of distribution of electric power based on the electric power request.

In the information processing system according to another aspect, the selection unit may determine a movement destination of the vehicle selected as the power source, and the request unit may transmit an electric power request including the movement destination to the vehicle selected as the power source. By notifying of the movement destination, it is possible to guide the vehicle to a place which is suitable for electric power supply. By using characteristics of a vehicle that it can move to another place and causing the vehicle to move to a place which is suitable for electric power supply and to supply electric power in that place, it is possible to flexibly complement the power supply source depending on a demand for electric power.

The information processing system according to another aspect may further include an incentive managing unit configured to provide an incentive to a user corresponding to the vehicle selected as the power source. By providing an incentive, it is possible to cause a user to provide electric power from the corresponding vehicle.

Modified Example

The present disclosure has been described above in detail in conjunction with an embodiment thereof. However, the present disclosure is not limited to the embodiment. The present disclosure can be modified in various forms without departing from the gist thereof.

The type of the database used for the information processing system is not limited to the embodiment above. For example, at least one of the vehicle database 21, the user database 22, and the environment information database 23 may be omitted or another database may be used. For example, the first acquisition unit of the information processing system may acquire battery information from each user terminal, each power transmitting device, or each vehicle (for example, each power receiving device) via a communication network, without using the vehicle database 21.

The process flow of the information processing method performed by at least one processor is not limited to the embodiment. For example, some of the above-mentioned steps (processes) may be omitted or the steps may be performed in different order. Two or more steps of the above-mentioned steps may be combined or some steps may be corrected or deleted. Alternatively, another step may be performed in addition to the above-mentioned steps. For example, the processes of Steps S15 and S17 may be omitted. That is, transmission of estimation information and provision of an incentive to a user may be omitted. Accordingly, the incentive managing unit is not a necessary element.

When the information processing system compares two numerical values with each other, any of two criteria of "equal to or greater than" and "greater than" may be used and any of two criteria of "equal to or less than" and "less than" may be used. Selection of this criterion does not change technical sense of the process of comparing two numerical values with each other.

INDUSTRIAL APPLICABILITY

According to an aspect of the present disclosure, it is possible to appropriately select a vehicle to be used for electric power supply to another facility.

REFERENCE SIGNS LIST

1 Information processing system
10 Server
11 Acquisition unit (first acquisition unit and second acquisition unit)
12 Selection unit
13 Request unit
14 Incentive managing unit
20 Database group 21 Vehicle database
22 User database
23 Environment information database
30 Vehicle
31 Power receiving device
32 Battery
40 Power supply source
41 Supply source terminal
50 User
51 User terminal
60 Power transmitting device
P Information processing program

The invention claimed is:

1. An information processing system comprising:
at least one processor configured to:
   acquire, from a device storing battery information on a battery of each of a plurality of vehicles, the battery information, wherein the battery information includes at least travel histories of each of the plurality of vehicles;
   acquire a predicted amount of shortage of a power plant from a supply source terminal of the power plant;
   select a vehicle moving to a power transmission area of the power plant as a power source out of the plurality of vehicles, based on the predicted amount of shortage and the travel histories;
   determine a designated place in the power transmission area as a movement destination in which the vehicle selected as the power source is scheduled to supply an electric power;
   transmit, to the vehicle selected as the power source, an electric power request which is a data signal for requesting the vehicle selected as the power source to provide the electric power, wherein the electric power request includes a movement instruction to cause the vehicle selected as the power source to move to the designated place.

2. The information processing system according to claim 1,
   wherein the at least one processor is configured to:
      acquire environment information from an environment information database that stores the environment information indicating weather;
      adjust the predicted amount of shortage by multiplying the predicted amount of shortage by a predetermined coefficient based on the weather indicated by the environment information; and
      select the vehicle as the power source based on the adjusted predicted amount of shortage and the travel histories.

3. The information processing system according to claim 1, wherein, when supply of electric power is permitted at the vehicle having received the request, a user terminal corresponding to the vehicle transmits a permission signal, and
   wherein the at least one processor is configured to:
      estimate actual supply of electric power from the one or more vehicles selected as the power source by collecting one or more of the permission signals; and
      transmit to the power plant estimation information indicating a schedule of electric power to be provided to the power plant.

4. The information processing system according to claim 1, wherein the at least one processor is configured to select the vehicle in which an SOC of the battery is equal to or greater than a threshold as the power source.

5. The information processing system according to claim 1, wherein the at least one processor is configured to:
   determine at least one of an amount of electric power to be provided, a provision destination, and a provision date and time for the vehicle selected as the power source; and
   transmit the electric power request further including at least one of the amount of electric power to be provided, the provision destination, and the provision date and time to the vehicle selected as the power source.

6. The information processing system according to claim 1, wherein the at least one processor is further configured to provide an incentive to a user corresponding to the vehicle selected as the power source.

* * * * *